US010336107B2

(12) United States Patent
Kawakami et al.

(10) Patent No.: US 10,336,107 B2
(45) Date of Patent: Jul. 2, 2019

(54) IMAGE FORMATION APPARATUS

(71) Applicant: Konica Minolta, Inc., Chiyoda-ku, Tokyo (JP)

(72) Inventors: Yoshiteru Kawakami, Hino (JP); Yasuo Shiokawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 166 days.

(21) Appl. No.: 15/647,665

(22) Filed: Jul. 12, 2017

(65) Prior Publication Data

US 2018/0015746 A1 Jan. 18, 2018

(30) Foreign Application Priority Data

Jul. 12, 2016 (JP) .................. 2016-137701

(51) Int. Cl.
*B41J 13/00* (2006.01)
*B41J 13/02* (2006.01)
*B41J 13/26* (2006.01)
*B41J 15/04* (2006.01)
*B65H 23/038* (2006.01)
*G03G 15/00* (2006.01)
*B41J 13/076* (2006.01)
(Continued)

(52) U.S. Cl.
CPC .......... *B41J 13/076* (2013.01); *G03G 15/607* (2013.01); *G03G 15/6567* (2013.01); *H04N 1/00602* (2013.01); *H04N 1/00615* (2013.01); *B41J 11/0095* (2013.01); *G03G 2215/00704* (2013.01)

(58) Field of Classification Search
CPC ........ B41J 11/00; B41J 11/0095; B41J 13/00; B41J 13/02; B41J 13/26; B41J 13/32; B41J 15/04; B65H 5/00; B65H 5/36; B65H 20/02; B65H 23/00; B65H 23/032; B65H 23/038; G03G 15/00; G03G 15/607; G03G 15/6567; G03G 21/00; G03G 2215/00704; H04N 1/00602; H04N 1/00615

See application file for complete search history.

(56) References Cited

U.S. PATENT DOCUMENTS 4,385,716 A * 5/1983 De Roeck ............ B65H 23/038
101/228
2016/0221372 A1* 8/2016 Kozuma ............ B65H 23/0326

FOREIGN PATENT DOCUMENTS

JP   2007022680        2/2007
JP   2017072646 A  *   4/2017    ......... G03G 15/6567

* cited by examiner

*Primary Examiner* — Nguyen Q. Ha
(74) *Attorney, Agent, or Firm* — Cantor Colburn LLP

(57) ABSTRACT

An electrophotographic image formation apparatus capable of forming an image on a recording medium, comprising: a first swinging roller and a first deviation sensor disposed between a secondary transfer roller and a first bent portion; a second bent portion disposed upstream of the first bent portion and changing the direction in which the recording medium is transported; a second swinging roller and a second deviation sensor disposed between the first bent portion and the second bent portion; and a control unit which controls an amount of movement of the first swinging roller based on a first detected positional value of the recording medium sensed by the first deviation sensor and controls an amount of movement of the second swinging roller based on a second detected positional value of the recording medium sensed by the second deviation sensor.

8 Claims, 10 Drawing Sheets

(51) Int. Cl.
*H04N 1/00* (2006.01)
*B41J 11/00* (2006.01)

IMAGE FORMATION APPARATUS

CROSS-REFERENCE TO RELATED APPLICATIONS

The present invention claims priority under 35 U.S.C. § 119 to Japanese Patent Application No. 2016-137701 filed with the Japan Patent Office on Jul. 12, 2016, the entire content of which is hereby incorporated by reference.

BACKGROUND OF THE INVENTION

Field of the Invention

The present invention relates to an image formation apparatus which forms an image in an electrophotographic system. An image formation apparatus, regardless of whether it may be a color image formation apparatus or a monochrome image formation apparatus, includes a digital copier, a fax, a printer and a similar electrophotographic device, a recorder, a display device etc.

Description of the Related Art

An electrophotographic image formation apparatus such as a copier, a printer, a facsimile, and an MFP, supplies an electrostatic latent image formed on a photoreceptor with a developing agent from a developing device to form an image of the developing agent. In recent years, an electrophotographic image formation apparatus capable of forming an image on a continuous medium (a recording medium such as a long sheet of paper) is required to be compact as a whole, allow both-sided sheet passage, etc.

Japanese Laid-Open Patent Publication No. 2007-22680 discloses an image formation apparatus comprising a sheet aligning device capable of smoothly moving a sheet widthwise when correcting lateral registration.

SUMMARY OF INVENTION

As has been indicated above, in order to meet the demands for making an image formation apparatus compact as a whole, both-sided sheet passage, etc., the image formation apparatus may internally have a transport path for a continuous medium in the form of a bent path folded in the form of the letter S.

In a case where an image formation apparatus is provided with such a bent path, when a recording medium undergoes a swinging positional correction (i.e., a positional correction in the recording medium's widthwise direction traversing a direction in which the recording medium is transported), a leading end of the recording medium in the transportation direction is located near a swinging registration roller, and the recording medium can thus be relatively easily swung and thus positionally corrected. However, it is difficult to swing a part of the recording medium located at a bent portion, the rear end of the recording medium, in particular, due to the bent portion's resistance. Accordingly, poor correction of bending/deviation of the rear end of the recording medium may be a matter of concern.

The present invention has been made in view of the above issue, and an object thereof is to provide an image formation apparatus comprising a configuration capable of appropriately correcting a transport path of a recording medium.

To achieve the above object, an image formation apparatus reflecting one aspect of the present invention comprises an electrophotographic image formation apparatus capable of forming an image on a recording medium, comprising: a secondary transfer roller which transfers a toner image to the recording medium; a first bent portion disposed upstream of the secondary transfer roller, as observed in a direction in which the recording medium is transported, and changing the direction in which the recording medium is transported; a first swinging roller and a first deviation sensor disposed between the secondary transfer roller and the first bent portion; a second bent portion disposed upstream of the first bent portion, as observed in the direction in which the recording medium is transported, and changing the direction in which the recording medium is transported; a second swinging roller and a second deviation sensor disposed between the first bent portion and the second bent portion; and a control unit which controls an amount of movement of the first swinging roller based on a first detected positional value of the recording medium sensed by the first deviation sensor and controls an amount of movement of the second swinging roller based on a second detected positional value of the recording medium sensed by the second deviation sensor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An image formation apparatus in an embodiment based on the present invention will be described hereinafter with reference to the drawings. Note that in any embodiment described hereafter, when numbers, amounts and the like are referred to, the present invention is not necessarily limited in scope thereto unless otherwise indicated. Identical and corresponding components and parts are identically denoted and may not be described repeatedly. Furthermore, the drawings are not shown in accordance with an actual dimensional ratio, and to help understanding a structure, there is a portion shown with a modified ratio to clarify the structure.

First Embodiment

Figure 1:
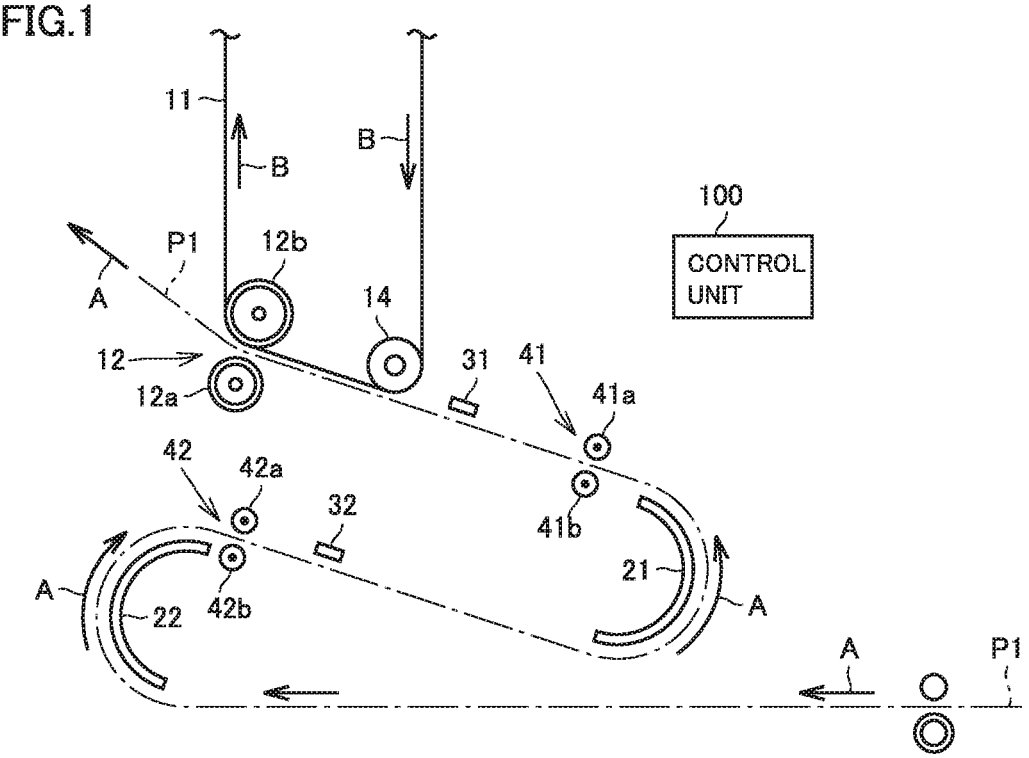
FIG. 1 is a schematic diagram showing a transport path of a recording medium provided inside an image formation apparatus of a first embodiment.
Figure 2:
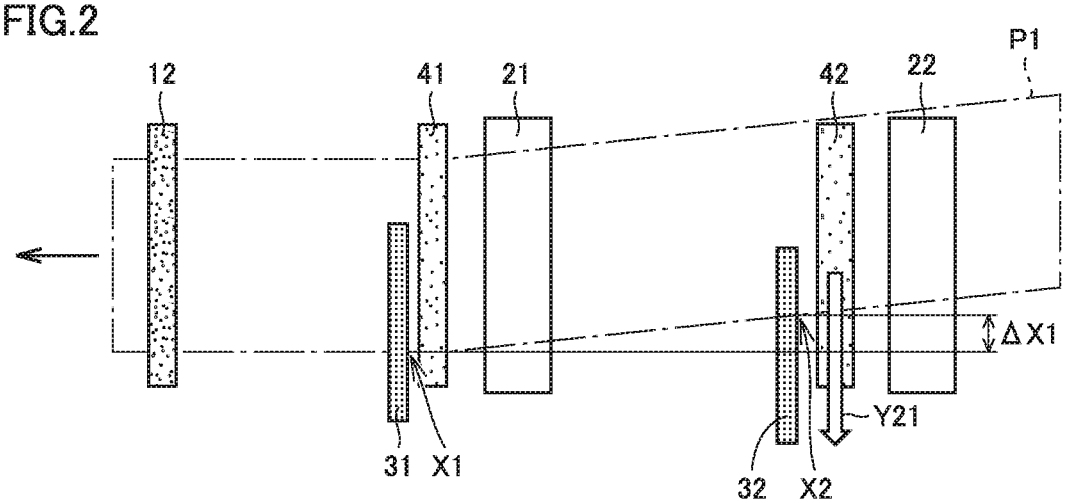
FIG. 2 is a schematic diagram showing the transport path of the recording medium in the image formation apparatus of the first embodiment developed in a plane.
Figure 3:
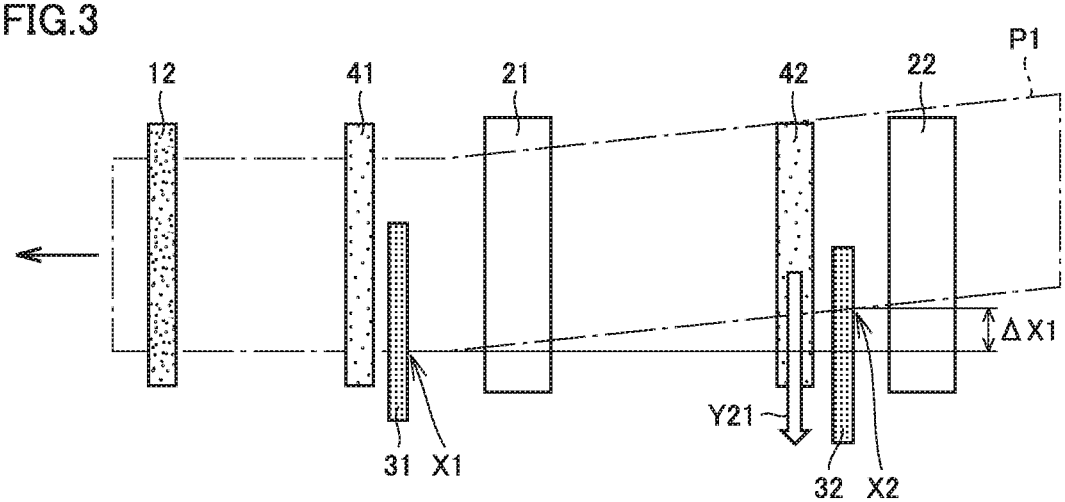
FIG. 3 is a schematic diagram showing a transport path of a recording medium in an image formation apparatus of the first embodiment in an exemplary variation developed in a plane.

With reference to FIGS. 1 to 3, a schematic configuration of an image formation apparatus in a first embodiment will be described. FIG. 1 is a schematic diagram showing a transport path of a recording medium provided inside the image formation apparatus, FIG. 2 is a schematic diagram showing the transport path of the recording medium developed in a plane, and FIG. 3 is a schematic diagram showing a transport path of a recording medium in an exemplary variation developed in a plane.

With reference to FIG. 1, a toner image formed in an electrophotographic system is transferred onto a transfer belt 11, and rotated and thus transported in a direction indicated in the figure by an arrow B. Transfer belt 11 is supported by a heating roller 12b and a support roller 14. A pressure applying roller 12a is disposed at a position opposite to heating roller 12b with transfer belt 11 interposed. Pressure applying roller 12a and heating roller 12b configure a secondary transfer roller 12 which transfers the toner image on transfer belt 11 to a recording medium P1. On a transport path of recording medium P1, recording medium P1 is transported in a direction indicated in FIG. 1 by an arrow A.

Recording medium P1 may be any appropriate medium, and for example it may be a variety of paper such as regular paper ranging from thin paper to thick paper, fine quality paper, coated printing paper such as art paper or coated paper, commercially available Japanese paper, postcard paper, synthetic paper, film, and cloth. Of these, synthetic paper and film are preferable. A specific example of synthetic paper is polypropylene synthetic paper for example. Furthermore, specific examples of film include polyethylene terephthalate film (PET film), polyethylenenaphthalate film, polyimide film and the like. Furthermore, an elongate recording medium using these can also be used.

The transport path of recording medium P1 is provided with a first bent portion 21 and a second bent portion 22 in a direction in which recording medium P1 is transported. First bent portion 21 and second bent portion 22 are semicircular cylindrical guide plates, for example. Recording medium P1 transported from an external transport path has its transportation direction turned around second bent portion 22 by about 180 degrees. Subsequently, recording medium P1 has its transportation direction turned around first bent portion 21 by about 180 degrees. Thus, the transport path of recording medium P1 configures a path generally in the form of the letter S. As a result, the transport path of recording medium P1 can be compact.

Recording medium P1 having its transportation direction turned around first bent portion 21 by about 180 degrees passes secondary transfer roller 12, and the toner image on transfer belt 11 is thus transferred onto recording medium P1.

The transport path of recording medium P1 in the present embodiment is provided between secondary transfer roller 12 and first bent portion 21 with a first deviation sensor 31 and a first swinging roller 41. First deviation sensor 31 senses lateral deviation of recording medium P1 orthogonal to the transportation direction.

First deviation sensor 31 is for example a sensor which has light projecting and receiving elements using a plurality of lasers to sense whether the recording medium interrupts laser light to detect a position of an end side of recording medium P1. Deviation sensors described hereinafter are also similar.

First swinging roller 41 sandwiches recording medium P1 by a first roller 41a and a second roller 41b and corrects positional displacement of recording medium P1 in a direction orthogonal to the transportation direction. An amount of positional displacement of recording medium P1 obtained by first deviation sensor 31 (a first detected positional value) is input to a control unit 100. In the present embodiment, when observed in the direction in which recording medium P1 is transported, first deviation sensor 31 is provided downstream of first swinging roller 41.

Between first bent portion 21 and second bent portion 22, a second deviation sensor 32 and a second swinging roller 42 are provided. Second deviation sensor 32 senses lateral deviation of recording medium P1 orthogonal to the transportation direction. Second swinging roller 42 sandwiches recording medium P1 by a first roller 42a and a second roller 42b and corrects positional displacement of recording medium P1 in a direction orthogonal to the transportation direction. An amount of positional displacement of recording medium P1 obtained by second deviation sensor 32 (a second detected positional value) is input to control unit 100. In the present embodiment, when observed in the direction in which recording medium P1 is transported, second deviation sensor 32 is provided downstream of second swinging roller 42.

Reference will now be made to FIG. 2 to describe how the correction of the transport path of the recording medium in the image formation apparatus configured as described above is controlled. Before recording medium P1 plunges to secondary transfer roller 12, control unit 100 calculates an amount of movement of first swinging roller 41 based on the first detected positional value of recording medium P1 sensed by first deviation sensor 31 and swings first swinging roller 41 to correct deviation of recording medium P1.

Subsequently, after recording medium P1 has plunged to secondary transfer roller 12 (see the state shown in FIG. 2), control unit 100 exerts control to calculate an amount of movement of second swinging roller 42 based on the second detected positional value of recording medium P1 sensed by second deviation sensor 32 and swing second swinging roller 42 by a prescribed distance to correct deviation of recording medium P1.

More specifically, as shown in FIG. 2, when the first detected positional value of recording medium P1 sensed by first deviation sensor 31 is represented as X1 and the second detected positional value of recording medium P1 sensed by second deviation sensor 32 is represented as X2, then after recording medium P1 has plunged to secondary transfer roller 12, second swinging roller 42 is controlled to swing recording medium P1 by $\Delta X1$ (i.e., X1−X2) (in a direction Y21).

By exerting control to correct deviation of recording medium P1, as described above, not only a leading end side of recording medium P1 can have deviation corrected but a rear end side of recording medium P1 receiving a resistance exerted by the S-letter bent path against swinging can also have deviation corrected by second swinging roller 42.

Although second swinging roller 42 swings after recording medium P1 has plunged to secondary transfer roller 12, recording medium P1 has been pressed by first swinging roller 41, and accordingly, secondary transfer roller 12 and an image forming position which is a widthwise position of recording medium P1 are not affected, and an image is transferred without displacement.

Note that while in the configuration shown in FIG. 1 and FIG. 2, when observed in the direction in which recording medium P1 is transported, first swinging roller 41 is disposed upstream of first deviation sensor 31 and second swinging roller 42 is disposed upstream of second deviation sensor 32, disposing first deviation sensor 31 upstream of first swinging roller 41 and second deviation sensor 32 upstream of second swinging roller 42, as shown in FIG. 3, can also achieve a similar function and effect.

Second Embodiment

Figure 4:
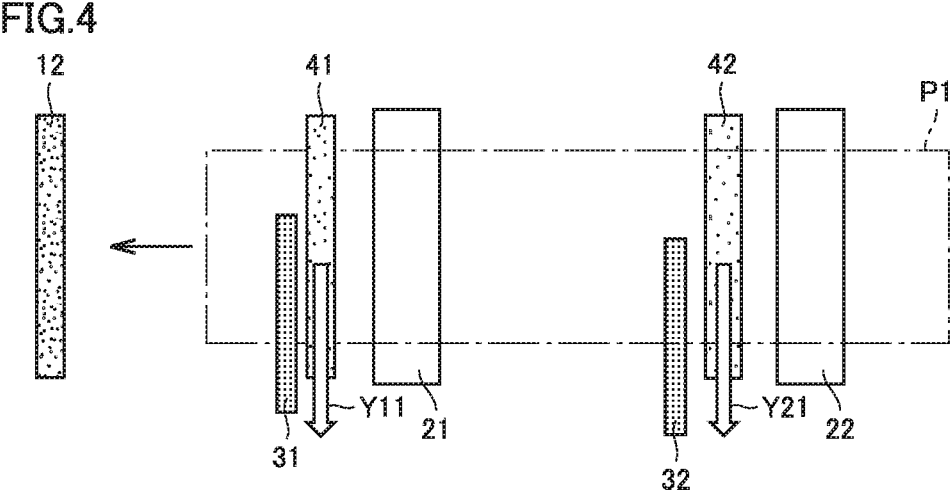
FIG. 4 is a schematic diagram showing a transport path of a recording medium in an image formation apparatus of a second embodiment developed in a plane.

Hereinafter, with reference to FIG. 4, a schematic configuration of an image formation apparatus in a second embodiment will be described. FIG. 4 is a schematic diagram showing a transport path of a recording medium developed in a plane.

The image formation apparatus is identical in configuration to the first embodiment and is different in how correction of deviation of recording medium P1 is controlled. In the second embodiment, before recording medium P1 plunges to secondary transfer roller 12, control unit 100 exerts control to calculate an amount of movement of first swinging roller 41 based on the first detected positional value of recording medium P1 sensed by first deviation sensor 31 and swing first swinging roller 41 by a prescribed distance (in a direction Y11) to correct deviation of recording medium P1, and control unit 100 also exerts control to calculate an amount of movement of second swinging roller 42 based on the second detected positional value of recording medium P1 sensed by second deviation sensor 32 and swing second swinging roller 42 by a prescribed distance (in a direction Y21) to correct deviation of recording medium P1.

By exerting control to correct deviation of recording medium P1, as described above, before recording medium P1 plunges to secondary transfer roller 12, not only the leading end side of recording medium P1 can have deviation corrected but the rear end side of recording medium P1 receiving a resistance exerted by the S-letter bent path against swinging can also have deviation corrected by second swinging roller 42.

Disposing first deviation sensor 31 upstream of first swinging roller 41 and second deviation sensor 32 upstream of second swinging roller 42, as described in the first embodiment with reference to FIG. 3, can also achieve a similar function and effect.

Third Embodiment

Figure 5:
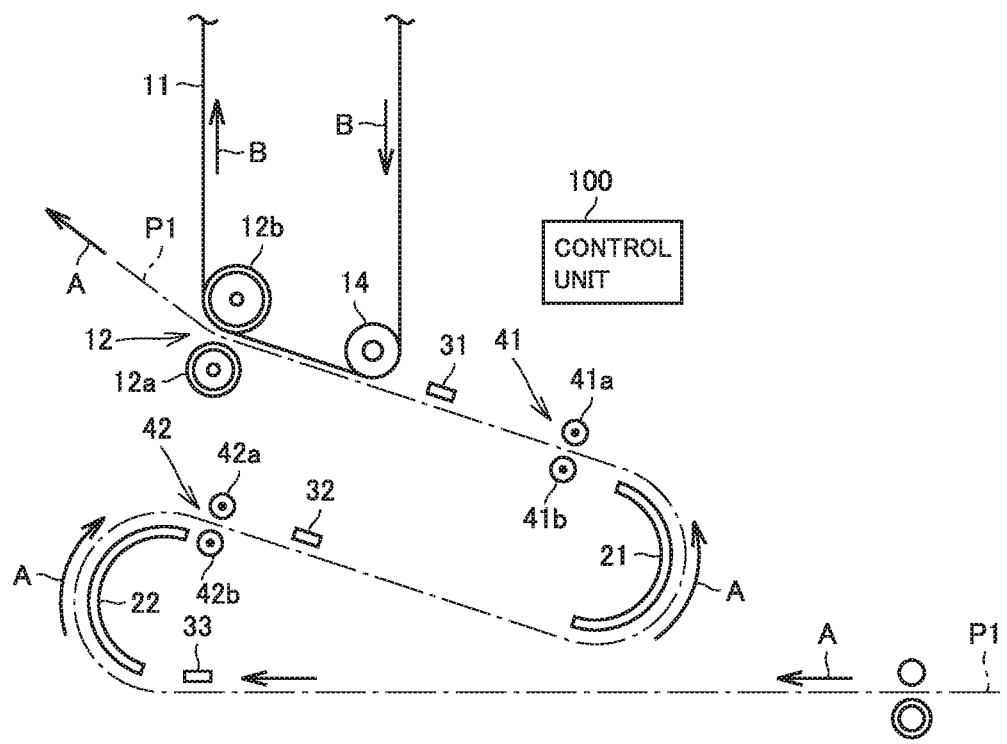
FIG. 5 is a schematic diagram showing a transport path of a recording medium provided inside an image formation apparatus of a third embodiment.

Hereinafter, with reference to FIG. 5 and FIG. 6, a schematic configuration of an image formation apparatus in a third embodiment will be described. FIG. 5 is a schematic diagram showing a transport path of a recording medium provided inside the image formation apparatus, and FIG. 6 is a schematic diagram showing the transport path of the recording medium developed in a plane.

The image formation apparatus has a basic configuration identical to that of the image formation apparatus in the first embodiment shown in FIG. 1 and is different in that, when observed in the direction in which recording medium P1 is transported, a third deviation sensor 33 is disposed upstream of second bent portion 22.

In the image formation apparatus having this configuration, after recording medium P1 has plunged to secondary transfer roller 12, control unit 100 exerts control to calculate an amount of movement of second swinging roller 42 based on second detected positional value X2 of recording medium P1 sensed by second deviation sensor 32 and a third detected positional value X3 of recording medium P1 sensed by third deviation sensor 33 and swing second swinging roller 42 to correct deviation of recording medium P1.

Figure 6:
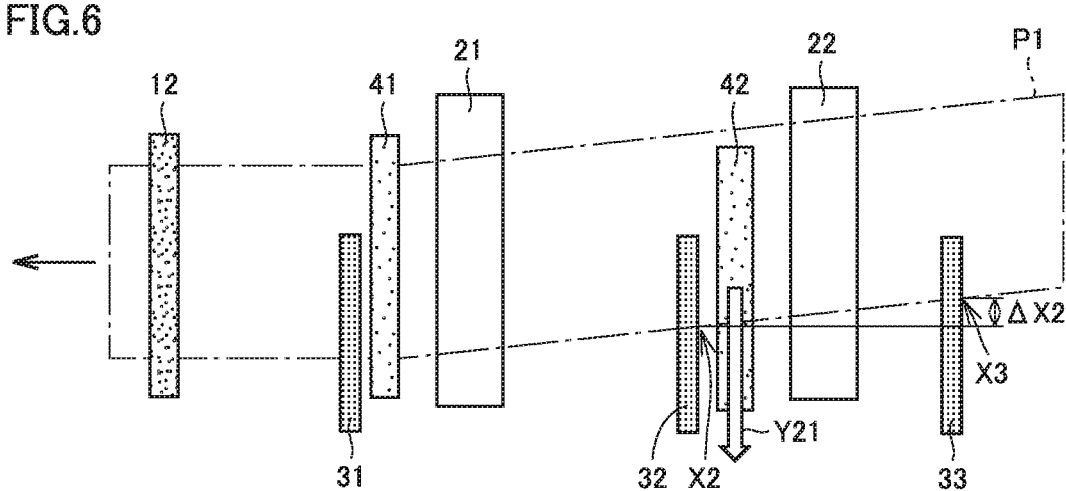
FIG. 6 is a schematic diagram showing the transport path of the recording medium in the image formation apparatus of the third embodiment developed in a plane.

More specifically, as shown in FIG. 6, after recording medium P1 has plunged to secondary transfer roller 12, AX2 (i.e., X2−X3) is calculated, where X2 represents a second detected positional value of recording medium P1 sensed by second deviation sensor 32 and X3 represents a third detected positional value of recording medium P1 sensed by third deviation sensor 33. Subsequently, $AX1=A \times AX2$ is calculated as an amount of swinging of second swinging roller 42 (in direction Y21). Herein, A represents a coefficient calculated from a parameter (a material, a surface resistance, etc.) of second bent portion 22 and the type of recording medium P1.

By exerting control to correct deviation of recording medium P1, as described above, positional displacement of recording medium P1 on the rear end side can be corrected.

Fourth Embodiment

Figure 7:
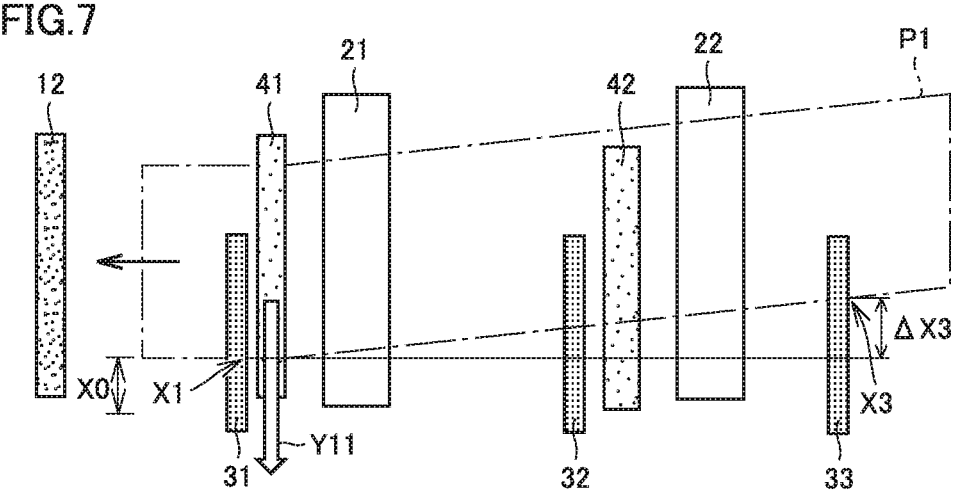
FIG. 7 is a schematic diagram showing a transport path of a recording medium in an image formation apparatus of a fourth embodiment developed in a plane.

Hereinafter, with reference to FIG. 7, a schematic configuration of an image formation apparatus in a fourth embodiment will be described. FIG. 7 is a schematic diagram showing a transport path of a recording medium in the fourth embodiment developed in a plane.

The image formation apparatus has a basic configuration identical to that of the image formation apparatus shown in FIG. 3, and third deviation sensor 33 is disposed upstream of second bent portion 22.

In the image formation apparatus having this configuration, before recording medium P1 plunges to secondary transfer roller 12, control unit 100 exerts control to calculate an amount of movement of first swinging roller 41 based on the first detected positional value of recording medium P1 sensed by first deviation sensor 31 and the third detected positional value of recording medium P1 sensed by third deviation sensor 33 and swing first swinging roller 41 to correct deviation of recording medium P1.

More specifically, as shown in FIG. 7, before recording medium P1 plunges to secondary transfer roller 12, AX3 (i.e., X1−X3) is calculated, where X1 represents a first detected positional value of recording medium P1 sensed by first deviation sensor 31 and X3 represents a third detected positional value of recording medium P1 sensed by third deviation sensor 33. Subsequently, $AX0=B \times AX3$ is calculated as an amount of swinging of first swinging roller 41 (in direction Y11). Herein, B represents a coefficient calculated from a parameter (a material, a surface resistance, etc.) of first bent portion 21 and the type of recording medium P1.

By exerting control to correct deviation of recording medium P1, as described above, positional displacement of recording medium P1 on the rear end side can be corrected.

Fifth Embodiment

Figure 8:
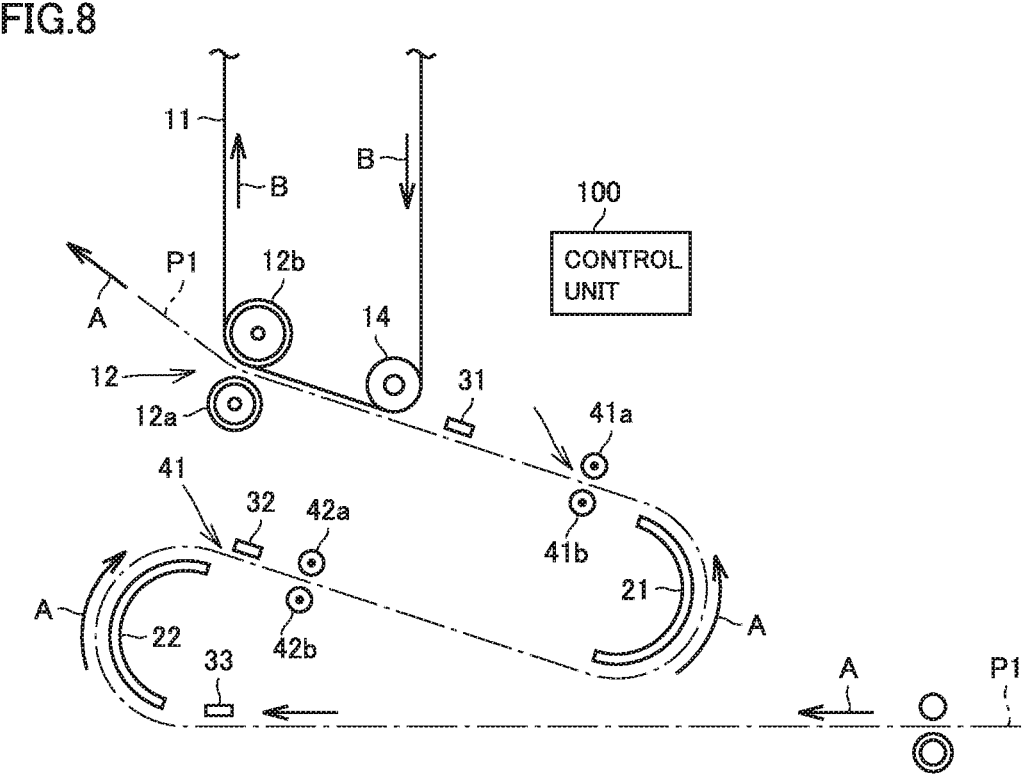
FIG. 8 is a schematic diagram showing a transport path of a recording medium provided inside an image formation apparatus of a fifth embodiment.
Figure 9:
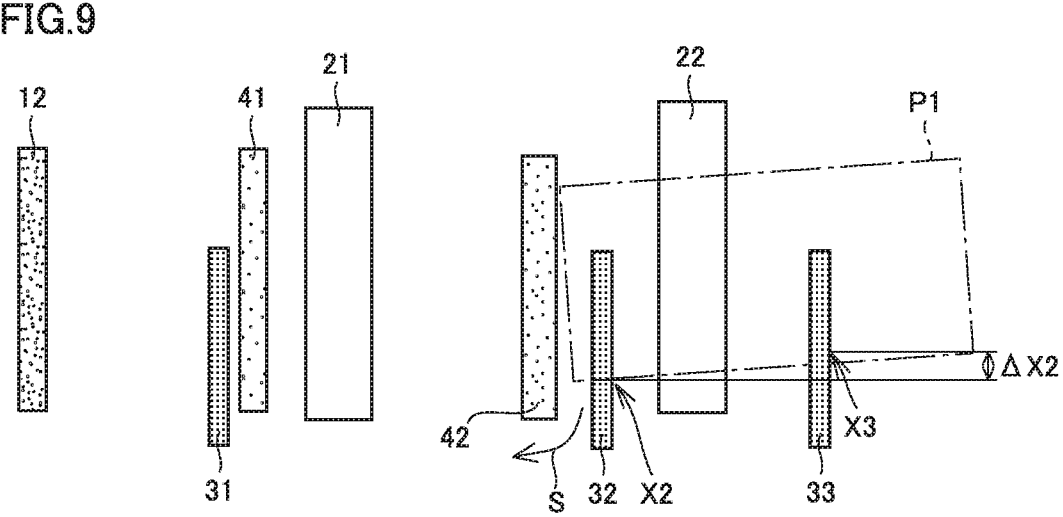
FIG. 9 is a schematic diagram showing the transport path of the recording medium in the image formation apparatus of the fifth embodiment developed in a plane.

Hereinafter, with reference to FIG. 8 and FIG. 9, a schematic configuration of an image formation apparatus in a fifth embodiment will be described. FIG. 8 is a schematic diagram showing a transport path of a recording medium provided inside the image formation apparatus, and FIG. 9 is a schematic diagram showing the transport path of the recording medium developed in a plane.

The image formation apparatus has a basic configuration identical to that of the image formation apparatus in the third embodiment shown in FIG. 5, and is different in that second deviation sensor 32 is disposed upstream of second swinging roller 42. Furthermore, second swinging roller 42 has a mechanism to tilt second swinging roller 42 relative to the direction in which recording medium P1 is transported. As shown in FIG. 9, second swinging roller 42 is provided pivotably in a direction indicated in the figure by an arrow S and allows a so-called skew correction.

In the image formation apparatus having this configuration, before recording medium P1 plunges to second swinging roller 42, control unit 100 exerts control to calculate an amount of movement of second swinging roller 42 based on the second detected positional value of recording medium P1 sensed by second deviation sensor 32 and the third detected positional value of recording medium P1 sensed by third deviation sensor 33 and tilt second swinging roller 42 to correct bending (or a skew) of recording medium P1.

Note that when second swinging roller 42 is tilted it may be done so by the mechanism such that second swinging roller 42 is (physically) tilted or second swinging roller 42 may be controlled to be stopped or counter-rotated to form a loop to correct bending. In that case, an amount of bending is calculated based on a sensor's sensed value and an abutment time and a counter-rotation time are controlled accordingly.

More specifically, as shown in FIG. 9, before recording medium P1 plunges to second swinging roller 42, $\Delta X2$ (i.e., X2−X3) is calculated, where X2 represents a second detected positional value of recording medium P1 sensed by second deviation sensor 32 and X3 represents a third detected positional value of recording medium P1 sensed by third deviation sensor 33. Subsequently, considering $\Delta X2$, an amount of tilting of second swinging roller 42 (in a direction S) is calculated.

By exerting control to correct deviation of recording medium P1, as described above, positional displacement of recording medium P1 can be corrected before recording medium P1 plunges to first bent portion 21.

Sixth Embodiment

Figure 10:
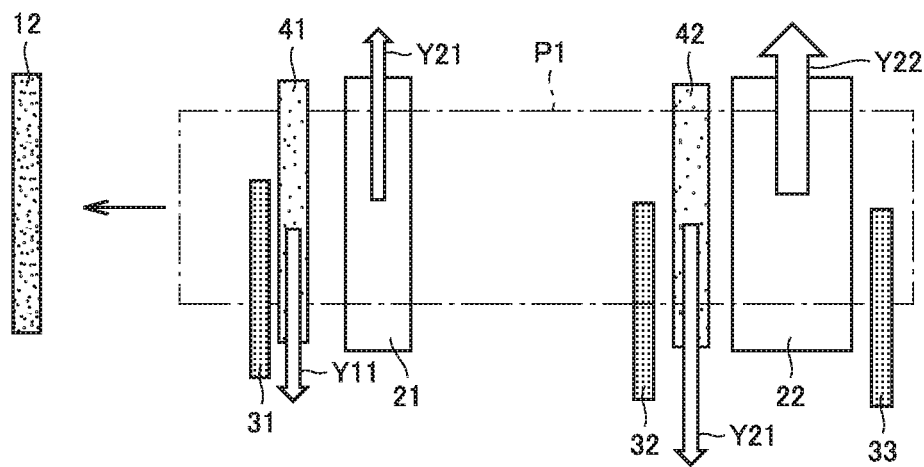
FIG. 10 is a schematic diagram showing a transport path of a recording medium in an image formation apparatus of a sixth embodiment developed in a plane.

With reference to FIG. 10, a schematic configuration of an image formation apparatus in a sixth embodiment will be described. FIG. 10 is a schematic diagram showing a transport path of a recording medium developed in a plane. The image formation apparatus in the present embodiment has the same configuration as an apparatus as the image formation apparatus in the third embodiment shown in FIG. 6, except that first bent portion 21 and second bent portion 22 are different in form. Second bent portion 22 is smaller in radius than first bent portion 21.

While first bent portion 21 and second bent portion 22 are both composed of a semicircular cylindrical guide plate, they may be different in radius. The smaller radius a bent portion has, the more rapidly recording medium P1 will have its transportation direction turned around by about 180 degrees, and accordingly, a resistance provided to swinging of recording medium P1 caused while it is transported is increased and recording medium P1 is easily bent/displaced.

In contrast, the larger radius a bent portion has, the more gently recording medium P1 will have its transportation direction turned around by about 180 degrees, and accordingly, a resistance provided to recording medium P1 while it is transported is reduced and recording medium P1 is thus easily transported. As a result, recording medium P1 is not easily bent/displaced at the bent portion.

In FIG. 10, second bent portion 22 is larger in radius than first bent portion 21 and hence second bent portion 22 exerts a smaller resistance against recording medium P1 while it is transported.

In the image formation apparatus having this configuration, before recording medium P1 plunges to secondary transfer roller 12, an amount of movement of first swinging roller 41 is calculated using a pre-plunge correction value taking the shape of first bent portion 21 into consideration, and similarly, an amount of movement of second swinging roller 42 is calculated using a pre-plunge correction value taking the shape of second bent portion 22 into consideration.

More specifically, as has been set forth above, first bent portion 21 is small in radius, and accordingly, exerts a large resistance to recording medium P1 while it is transported. As a result, recording medium P1 is easily bent/displaced at the bent portion, and accordingly, an amount of movement of first swinging roller 41 is increased. In contrast, second bent portion 22 is larger in radius than first bent portion 21, and accordingly, exerts a smaller resistance to recording medium P1 than first bent portion 21 while recording medium P1 is transported. As a result, recording medium P1 is not easily bent/displaced at the bent portion, and accordingly, an amount of movement of second swinging roller 42 is made smaller than an amount of movement of first swinging roller 41.

For example, when the first detected positional value of recording medium P1 sensed by first deviation sensor 31 is X1, an amount of movement of first swinging roller 41 is set to "X1+a pre-plunge correction value $\alpha$" and when the second detected positional value of recording medium P1 sensed by second deviation sensor 32 is X2, an amount of movement of second swinging roller 42 is set to "X2+a pre-plunge correction value $\beta$" and a relationship of pre-plunge correction value $\alpha$>pre-plunge correction value $\beta$ is set.

Note that when first bent portion 21 and second bent portion 22 have a relationship in shape opposite to the above, a relationship of pre-plunge correction value $\alpha$<pre-plunge correction value $\beta$ is set.

Thus using a pre-plunge correction value taking the shapes of first bent portion 21 and second bent portion 22 into consideration can suppress bending/deviation of recording medium P1 attributed to a difference in shape between first bent portion 21 and second bent portion 22.

Note that after recording medium P1 has plunged to secondary transfer roller 12, an amount of movement of second swinging roller 42 may be calculated using a post-plunge correction value $\beta'$ different from the pre-plunge correction value and taking the shape of second bent portion 22 into consideration. After recording medium P1 has plunged to secondary transfer roller 12, recording medium P1 will be restrained by secondary transfer roller 12, and accordingly, an effect at first bent portion 21 is reduced, whereas a resistance at second bent portion 22 tends to be increased. Accordingly, when the correction values at second bent portion 22 are compared, it is preferable to make post-plunge correction value $\beta'$ larger than pre-plunge correction value $\beta$.

The present image formation apparatus is an electrophotographic image formation apparatus cable of forming an image on a recording medium, comprising: a secondary transfer roller which transfers a toner image to the recording medium; a first bent portion disposed upstream of the secondary transfer roller, as observed in a direction in which the recording medium is transported, and changing the direction in which the recording medium is transported; a first swinging roller and a first deviation sensor disposed between the secondary transfer roller and the first bent portion; a second bent portion disposed upstream of the first bent portion, as observed in the direction in which the recording medium is transported, and changing the direction in which the recording medium is transported; a second swinging roller and a second deviation sensor disposed between the first bent portion and the second bent portion; and a control unit which controls an amount of movement of the first swinging roller based on a first detected positional value of the recording medium sensed by the first deviation sensor and controls an amount of movement of the second swinging roller based on a second detected positional value of the recording medium sensed by the second deviation sensor.

In another aspect, before the recording medium plunges to the secondary transfer roller, the control unit exerts control to calculate an amount of movement of the first swinging roller based on the first detected positional value of the recording medium and swing the first swinging roller to correct deviation of the recording medium, and after the recording medium has plunged to the secondary transfer roller, the control unit exerts control to calculate an amount of movement of the second swinging roller based on the second detected positional value of the recording medium sensed by the second deviation sensor and swing the second swinging roller to correct deviation of the recording medium.

In another aspect, as observed in the direction in which the recording medium is transported, a third deviation sensor is disposed upstream of the second bent portion, and after the recording medium has plunged to the secondary transfer roller, the control unit exerts control to calculate an amount of movement of the second swinging roller based on the second detected positional value of the recording medium sensed by the second deviation sensor and a third detected positional value of the recording medium sensed by the third deviation sensor and swing the second swinging roller to correct deviation of the recording medium.

In another aspect, before the recording medium plunges to the secondary transfer roller, the control unit exerts control to calculate an amount of movement of the first swinging roller based on the first detected positional value of the recording medium sensed by the first deviation sensor and swing the first swinging roller to correct deviation of the recording medium, and the control unit also exerts control to calculate an amount of movement of the second swinging roller based on the second detected positional value of the recording medium sensed by the second deviation sensor and swing the second swinging roller to correct deviation of the recording medium.

In another aspect, as observed in the direction in which the recording medium is transported, a third deviation sensor is disposed upstream of the second bent portion, and before the recording medium plunges to the secondary transfer roller, the control unit exerts control to calculate an amount of movement of the first swinging roller based on the first detected positional value of the recording medium sensed by the first deviation sensor and a third detected positional value of the recording medium sensed by the third deviation sensor and swing the first swinging roller to correct deviation of the recording medium.

In another aspect, as observed in the direction in which the recording medium is transported, a third deviation sensor is disposed upstream of the second bent portion and the second deviation sensor is disposed upstream of the second swinging roller; the second swinging roller has a mechanism to tilt the second swinging roller relative to the direction in which the recording medium is transported; and before the recording medium plunges to the second swinging roller, the control unit exerts control to calculate an amount of tilting of the second swinging roller based on the second detected positional value of the recording medium sensed by the second deviation sensor and a third detected positional value of the recording medium sensed by the third deviation sensor and tilt the second swinging roller to correct bending of the recording medium.

In another aspect, before the recording medium plunges to the secondary transfer roller, the control unit calculates an amount of movement of the first swinging roller using a pre-plunge correction value taking a shape of the first bent portion into consideration and calculates an amount of movement of the second swinging roller using a pre-plunge correction value taking a shape of the second bent portion into consideration.

In another aspect, after the recording medium has plunged to the secondary transfer roller, the control unit calculates an amount of movement of the second swinging roller using a post-plunge correction value different from a pre-plunge correction value and taking a shape of the second bent portion into consideration.

While the present invention has been described in embodiments, it should be understood that the embodiments disclosed herein are illustrative and non-restrictive in any respect. The scope of the present invention is defined by the terms of the claims, and is intended to include any modifications within the meaning and scope equivalent to the terms of the claims.

What is claimed is:

1. An electrophotographic image formation apparatus capable of forming an image on a recording medium, comprising:
   a secondary transfer roller which transfers a toner image to the recording medium;
   a first bent portion disposed upstream of the secondary transfer roller, as observed in a direction in which the recording medium is transported, and changing the direction in which the recording medium is transported;
   a first swinging roller and a first deviation sensor disposed between the secondary transfer roller and the first bent portion;
   a second bent portion disposed upstream of the first bent portion, as observed in the direction in which the recording medium is transported, and changing the direction in which the recording medium is transported;
   a second swinging roller and a second deviation sensor disposed between the first bent portion and the second bent portion; and
   a control unit which controls an amount of movement of the first swinging roller based on a first detected positional value of the recording medium sensed by the first deviation sensor and controls an amount of movement of the second swinging roller based on a second detected positional value of the recording medium sensed by the second deviation sensor.

2. The image formation apparatus according to claim 1, wherein before the recording medium plunges to the secondary transfer roller, the control unit exerts control to calculate an amount of movement of the first swinging roller based on the first detected positional value of the recording medium and swing the first swinging roller to correct deviation of the recording medium, and after the recording medium has plunged to the secondary transfer roller, the control unit exerts control to calculate an amount of movement of the second swinging roller based on the second detected positional value of the recording medium sensed by the second deviation sensor and swing the second swinging roller to correct deviation of the recording medium.

3. The image formation apparatus according to claim 2, wherein:
as observed in the direction in which the recording medium is transported, a third deviation sensor is disposed upstream of the second bent portion; and
after the recording medium has plunged to the secondary transfer roller, the control unit exerts control to calculate an amount of movement of the second swinging roller based on the second detected positional value of the recording medium sensed by the second deviation sensor and a third detected positional value of the recording medium sensed by the third deviation sensor and swing the second swinging roller to correct deviation of the recording medium.

4. The image formation apparatus according to claim 1, wherein before the recording medium plunges to the secondary transfer roller, the control unit exerts control to calculate an amount of movement of the first swinging roller based on the first detected positional value of the recording medium sensed by the first deviation sensor and swing the first swinging roller to correct deviation of the recording medium, and the control unit also exerts control to calculate an amount of movement of the second swinging roller based on the second detected positional value of the recording medium sensed by the second deviation sensor and swing the second swinging roller to correct deviation of the recording medium.

5. The image formation apparatus according to claim 4, wherein:
as observed in the direction in which the recording medium is transported, a third deviation sensor is disposed upstream of the second bent portion; and
before the recording medium plunges to the secondary transfer roller, the control unit exerts control to calculate an amount of movement of the first swinging roller based on the first detected positional value of the recording medium sensed by the first deviation sensor and a third detected positional value of the recording medium sensed by the third deviation sensor and swing the first swinging roller to correct deviation of the recording medium.

6. The image formation apparatus according to claim 1, wherein:
as observed in the direction in which the recording medium is transported, a third deviation sensor is disposed upstream of the second bent portion and the second deviation sensor is disposed upstream of the second swinging roller;
the second swinging roller has a mechanism to tilt the second swinging roller relative to the direction in which the recording medium is transported; and
before the recording medium plunges to the second swinging roller, the control unit exerts control to calculate an amount of tilting of the second swinging roller based on the second detected positional value of the recording medium sensed by the second deviation sensor and a third detected positional value of the recording medium sensed by the third deviation sensor and tilt the second swinging roller to correct bending of the recording medium.

7. The image formation apparatus according to claim 1, wherein before the recording medium plunges to the secondary transfer roller, the control unit calculates an amount of movement of the first swinging roller using a pre-plunge correction value taking a shape of the first bent portion into consideration and calculates an amount of movement of the second swinging roller using a pre-plunge correction value taking a shape of the second bent portion into consideration.

8. The image formation apparatus according to claim 1, wherein after the recording medium has plunged to the secondary transfer roller, the control unit calculates an amount of movement of the second swinging roller using a post-plunge correction value different from a pre-plunge correction value and taking a shape of the second bent portion into consideration.

* * * * *